Dec. 20, 1960 H. NIERHAUS 2,965,401
SEAL
Filed Dec. 31, 1957
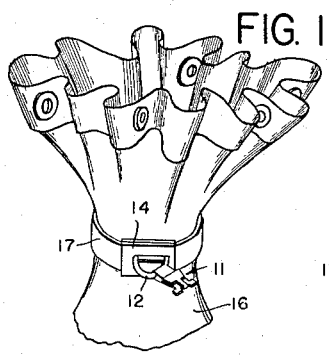
FIG. 1
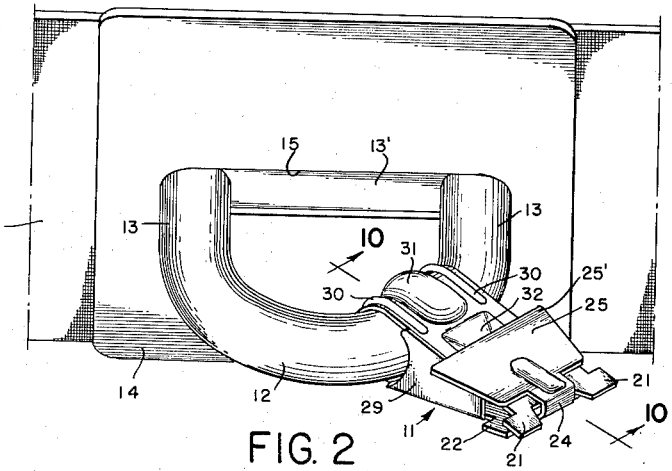
FIG. 2
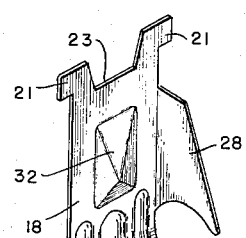
FIG. 3
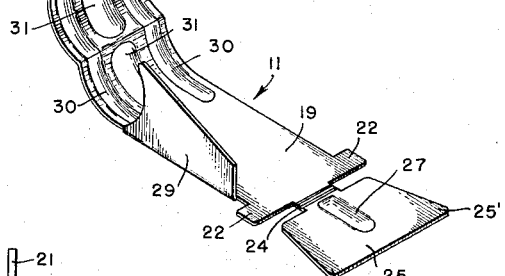
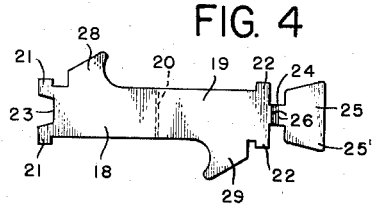
FIG. 4
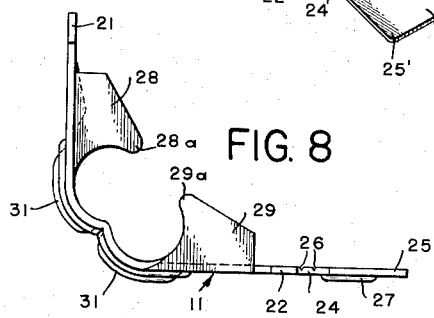
FIG. 8
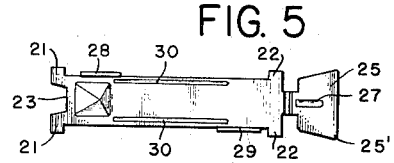
FIG. 5
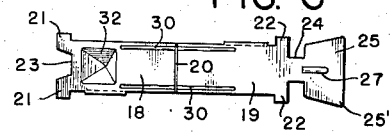
FIG. 6
FIG. 7
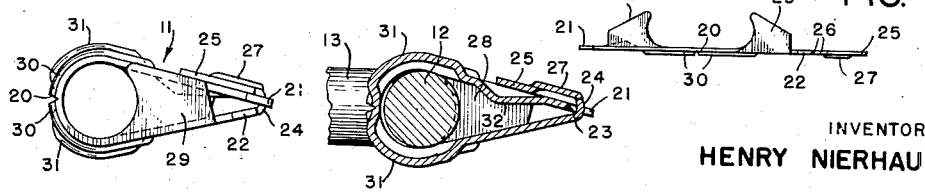
FIG. 9     FIG. 10
INVENTOR
HENRY NIERHAUS
BY
ATTORNEYS

United States Patent Office 2,965,401
Patented Dec. 20, 1960

2,965,401

SEAL

Henry Nierhaus, Scarsdale, N.Y., assignor to Stoffel Seals Corporation, Tuckahoe, N.Y.

Filed Dec. 31, 1957, Ser. No. 706,488

8 Claims. (Cl. 292—315)

The present invention relates to the protection of valuable goods and more particularly to a seal especially adapted for attachment to the staple of a hasp-type locking means and which cannot be removed without rupture of at least some portion of the seal thereby positively indicating any tempering.

Heretofore various types of seals have been used to visually indicate whether access has been obtained to the interior of a room, a bag, a container or the like but the previously known seals have not been entirely satisfactory because of the relatively high cost of manufacture, the possibility of tampering without detection, the difficulty of opening the seal, and the difficulty of applying the seal and the like.

An object of the present invention is to overcome the problems involved with prior art seals and to provide a seal which may be easily manipulated by relatively inexperienced persons without requiring excessive strength and without requiring special tools.

A further object is to provide a seal which may be readily opened and when opened will necessarily rupture the seal to indicate that the seal has been opened.

A further object is to provide a seal which snugly fits the bight portion of a staple as will as the straight legs so that the seal may freely pivot about the staple without having rupturing forces occurring during such pivotal movement.

Other objects and advantages of the invention will be apparent from the following description taken in conjunction with the accompanying drawing wherein:

Fig. 1 is a fragmentary perspective of the mouth of a conventional mail bag sealed with the seal of the present invention;

Fig. 2, an enlarged perspective of the seal applied to a staple affixed to one element of a hasp-type lock and with the bight portion of the staple passing through a slot in a plate with a seal secured to the bight to prevent opening of hasp-type lock without removal of the seal;

Fig. 3, an enlarged perspective of the seal in its condition immediately prior to its application to a staple;

Fig. 4, a plan view of the blank with the scored line and marks;

Fig. 5, a similar view of the blank after bending of the ears and impressment of the finger nail receiving recess and reinforcing ridges as viewed from the inside;

Fig. 6, an outside view of the blank of Fig. 5;

Fig. 7, a side elevation of the blank shown in Figs. 5 and 6;

Fig. 8, a side elevation of the blank after the bulges are formed and showing the seal ready to be applied;

Fig. 9, a side elevation of the seal in its closed or sealed condition;

Fig. 10, a section of the closed seal taken substantially on line 10—10 of Fig. 2;

Briefly stated, the seal of the present invention is formed in one piece from sheet metal by a punching and stamping process well known in the art. It is adapted to encircle either the straight leg portion or the bight portion of a staple of the type used with a hasp and to be closed and sealed around such staple with sufficient strength to remain thereon until the seal is broken, the seal being sufficiently small to avoid any excessive weight as well as to be attractive in its appearance.

Referring more particularly to the drawing, the tamper-proof seal generally indicated by reference numeral 11 is adapted to encircle a conventional staple having a curved bight portion 12 and straight legs 13, which are fixed to a supporting plate 13' and passed through a hasp-like element 14 having a slot 15 therein for snugly receiving the staple in a well known manner. The seal is shown in Fig. 1 as applied to a conventional mail bag 16 having a strap 17 which carries the hasp-like plate 14 and the staple 12 with the seal 11 attached thereto and applied in a well known manner.

Referring more particularly to Fig. 4, the metal from which the seal is formed comprises a body having two sections 18 and 19 connected along a scored line 20 defining a weakened portion in the material of the body, the section 18 being longer than the section 19. Laterally extending tabs 21 are provided at the free end of the section 18 while laterally extending tabs 22 are provided on each edge at the free end of the section 19, the section 18 being provided with a trapezoidal shaped notch 23 in its free end intermediate the tabs 21. A T-shaped detent having a short stem 24 and a transverse portion 25, which may have its lower edge substantially the same width as the section 19 and its upper edge 25 of somewhat greater width, providing finger engaging tips 25', is connected by the stem 24 to the free end of section 19, such stem being provided with a pair of scored marks 26 defining a pair of weakened portions on the inner surface. The T-shaped detent is provided with an outwardly pressed rib 27 extending from the scored marks 26 in the stem into the transverse portion 25 which may be distinctively colored.

In the blank shown in Fig. 4 a first ear 28 extends laterally from one edge of the section 18 while a second ear 29 extends laterally from the opposite edge of the section 19, the ends of the ears adjacent the scored line 20 being of arcuate shape.

The seal body is provided with a longitudinally extending reinforcing ridge 30 adjacent each edge of such body extending between and overlapping the ears 28 and 29, the ridges being formed by a stamping operation to deform the metal by a drawing-type action.

An outward bulge 31 is provided on each section between the scored line 20 and the adjacent arcuate ends of the ears 28, 29.

A finger nail receiving depression 32 of substantial depth is provided between the free end of the section 18 and its associated bulge 31. It will be evident that the rib 27, ridges 30, and finger nail receiving depression 32 may be stamped in a single operation by a drawing-type action and such operation may include the inward bending of ears 28 and 29 so that they are substantially perpendicular to the sections 18 and 19 respectively. The bulges 31 may also be formed by a stamping and forming operation causing a drawing of the metal and resulting in the angular relation shown in Figs. 3 and 8, in which figures it will be apparent that the spacing between the ears 28 and 29 is substantially equal to the diameter of the rod material of the staple to which the seal is to be applied.

The seal is applied to the staple by passing the seal over the staple 12 so that the staple substantially contacts the weakened area at scored line 20 and a person merely bends the seal to the closed position shown in Fig. 9 with the ears 28 and 29 serving as guides for the adjacent edges of the sections. Thereafter the T-shaped detent is manipulated by grasping the transverse portion 25 and bending the detent into an overlapping position as shown in Figs. 1, 2, 9, and 10. The scored marks 26 assure bending in the desired region and the rib 27 further assures that the bending will occur at such scored marks. Thus the stem 24 will positively be received within the trapezoidal notch 23 to prevent lateral displacement in both directions.

In order to remove the seal, a finger nail may be inserted in the depression 32 and an upward pressure applied to bend the detent back to an open position. In addition to opening the seal by the use of the finger nail depression, the seal may be opened by a person grasping the tips 25' of the transverse portion with the fingers even though the fingers are protected by gloves. The action of bending the detent back causes the detent to rupture or break along one of the scored marks 26. The body must then be spread to remove it from the staple and in order to do this the person grasps the tabs 21 and 22 which are offset as shown in Fig. 2 and pulls them apart which necessarily causes the body to separate or break along the scored line 20.

It will be noted in Figs. 3 and 8 that the seal 11 is originally of a shape wherein the sections 18 and 19 are substantially at right angles to each other and the ears 28 and 29 are positioned with their tip ends 28a and 29a spaced apart a distance approximately equal to the diameter of the rod of the staple 12 to receive the staple. After the seal is placed on the staple the seal is bent about score line 20 to the closed condition shown in Figs. 1, 2, 9 and 10. Thereafter the T-shaped detent is bent from the position shown in Figs. 3 and 8 to that of Figs. 1, 2, 9 and 10 thereby securing the seal on the staple so that the seal may slide along the staple or rotate about the staple without any stresses or strains which cause the seal to be ruptured in its normal use. It will be noted that the bulges 31 provide clearance which permits this sliding or rotating.

When the seal is to be removed the T-shaped detent must be opened before the sections 18 and 19 may be bent open approximately 90°. Opening of the detent sections 18 and 19 may rupture the seal at the score line. In any case if an attempt is made to reclose the seal, the bending necessary will cause the seal to rupture at score line 20 making tampering clearly evident because the sections will be completely severed.

It will also be evident that the reinforcing effect of the ridges, the bulges and the ears prevent bending in such reinforced portions and assures localized bending in the weakened portions along the scored line 20 or the scored marks 26.

The ears 28 and 29 are arranged on opposite sides of the seal to serve to confine the staple in a definite position relative to the seal so that the staple will not produce any unnecessary forces on the seal in the normal use of the staple or seal.

It will also be noted that the ears are arranged so that if the seal is once broken at either score line 20 or scored marks 26 it is not possible to replace the sections or detent without detection. Since the ear 28 is on one edge of one section and the ear 29 is on the other edge of the other section the ears cannot cooperate to clamp either section in fixed relation to the other section. In prior art seals the flanges or elements that correspond to the ears 28 or 29 of the present seal have been on the same seal section so that such ears or flanges could be bent together to clamp the other section in fixed position relative to said same seal section by the frictional pressure of such ears or flanges on the said other section. Consequently the present seal is a marked improvement over the prior art devices.

It will therefore be evident that applicant has provided a non-reusable seal which is readily applied to and removed from a staple like element and which has upstanding ear members which require substantially wide opening of the seal for removal from the staple, and in which the ear members are on alternate sides of the two main portions of the seal in order to prevent repositioning and frictional holding the two main portions in closed position after they have been opened, thus preventing fraudulent replacement without detection.

It will be obvious to those skilled in the art that various changes may be made in the invention, without departing from the spirit and scope thereof, and therefore the invention is not limited by that which is shown in the drawings and described in the specification, but only as indicated in the appended claims.

What is claimed is:

1. A tamper-proof metal seal comprising an elongated body having two sections connected together by a weakened area, one section being longer than the other section, a laterally extending tab on each edge at the free end of each section, the one section being provided with a trapezoidal notch in its free end, an ear extending inwardly from one edge of said one section and another ear extending inwardly from the other edge of the other section, the ears adjacent said weakened area being of arcuate shape, a T-shaped detent having a short stem and a transverse portion of substantially greater height than said stem connected by its stem to the free end of the other section, the width of said transverse portion being at least as great as the distance between the extremities of said tabs, said stem being provided with a weakened area, said detent having an outwardly pressed rib extending from said weakened area into said transverse portion, said body being provided with a longitudinally extending reinforcing ridge adjacent each edge of said body extending between and overlapping said ears, an outwardly bulging dimple on each section between said first weakened area and the adjacent arcuate end of its ear, the outer surface of said one section being provided with a finger nail receiving depression of substantial depth between the free end of said one section and its dimple, said seal providing for ready disposal around a staple whereby the sections may be bent relative to each other so their free ends come together with the tabs offset, said detent being bendable about said second weakened area with the stem receivable in said notch and said transverse portion overlying the outer surface of said one section and overlapping a portion of said finger nail receiving depression, said structure being such that any bending in said seal occurring after application of the seal will rupture said seal, thereby positively indicating any tampering.

2. A tamper-proof seal comprising an elongated sheet metal body having a first section and a second section connected together by the full width of the body along a scored line on the outer surface defining a weakened portion in the material of the body, said first section being longer than said second section, a laterally extending tab on each edge at the free end of each of said sections, said first section being provided with a trapezoidal notch in its free end, an ear extending inwardly from one edge of said first section and another ear extending inwardly from the opposite edge of said second section, said ears being of arcuate shape on the end toward said scored line, A T-shaped detent having a short stem and a transverse portion of substantially greater height connected by said stem to the free end of said second section.

3. A tamper-proof seal comprising an elongated sheet metal body having a first section and a second section connected together by the full width of the body along a scored line on the outer surface defining a weakened portion in the material of the body, said first section being longer than said second section, a laterally extending tab on each edge at the free end of each of said sections, said first section being provided with a trapezoidal notch in its free end, an ear extending inwardly from one edge of said first section and another ear extending inwardly from the opposite edge of said second section, said ears being of arcuate shape on the end toward said scored line, a T-shaped detent having a short stem and a transverse portion of substantially greater height connected by said stem to the free end of said second section, said body being provided with longitudinally extending reinforcing ridges adjacent each edge of said body extending between and overlapping the ears.

4. A seal for preventing tampering comprising an elongated body having two sections connected by a weakened portion, about which said sections may bend, the ends of the sections adjacent said weakened portion being curved to correspond to the curvature of a staple, a reinforcing and guiding ear extending inwardly from one edge of one section with the adjacent end of said ear cooperating with the curve providing a continuation of said curve, a second reinforcing and guiding ear extending inwardly from the other edge of the other section with the adjacent end of said second ear providing a continuation of said curve, means to sealingly secure the free ends of said seal together, and means to reinforce the sections between said weakened portion and the free ends thereby limiting rupturing bending to said weakened portion.

5. In a seal for preventing passage of the staple through a slot of a hasp in which the seal is made of a length of material bendable about a line intermediate its length and having means to secure the free ends of the material together, the improvement comprising an ear mounted on one section at one of its edges and projecting inwardly toward the other section when the sections are in sealing relation, and a second ear extending inwardly from the other edge of the other section toward said one section when the sections are in sealing relation whereby in application or removal of said seal the sections must be open to a wide angle before said ears can pass across said staple.

6. The invention according to claim 5 in which the sections are provided with reinforcing ridges between said ears and said line.

7. The invention according to claim 5 in which bulges are provided in said sections between said line and said ears to provide clearance to permit said seal to slide on the staple.

8. In a seal for attachment to a staple passing through a slot in a hasp-like element in which the seal includes a first and second section with the sections connected by a weakened portion and with rupturable means to secure the free ends of the sections together, the improvement comprising the portions of the sections adjacent to the weakened portion having arcuate curvature and having longitudinal reinforcing ridges for maintaining the arcuate shape of said curved portions, and an ear on an alternative side of each of said sections adjacent to said curved portion whereby the staple may be received within the curved portions of the sections and positively maintained in such position, and all of the bending of said two sections relative to each other may occur at the weakened portion.

References Cited in the file of this patent
UNITED STATES PATENTS

| | | |
|---|---|---|
| 1,017,837 | Wood | Feb. 20, 1912 |
| 1,820,595 | Brooks | Aug. 25, 1931 |
| 1,916,448 | Thomson et al. | July 4, 1933 |
| 2,465,349 | Brooks | Mar. 29, 1949 |
| 2,662,321 | Stoffel | Dec. 15, 1953 |
| 2,809,651 | Moberg | Oct. 15, 1957 |